(12) United States Patent
Parikh et al.

(10) Patent No.: US 7,697,812 B2
(45) Date of Patent: Apr. 13, 2010

(54) ENCLOSURE AND ORGANIZER FOR TELECOMMUNICATION LINES AND SPLICES

(75) Inventors: Rutesh D. Parikh, Austin, TX (US); William G. Allen, Austin, TX (US); Thomas E. Bludau, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/332,416

(22) Filed: Dec. 11, 2008

(65) Prior Publication Data

US 2009/0185782 A1 Jul. 23, 2009

Related U.S. Application Data

(60) Provisional application No. 61/022,052, filed on Jan. 18, 2008.

(51) Int. Cl.
*G02B 6/00* (2006.01)
(52) U.S. Cl. ........................................ 385/135; 385/134
(58) Field of Classification Search ................. 385/135; 174/50
See application file for complete search history.

(56) References Cited

U.S. PATENT DOCUMENTS

| | | | | |
|---|---|---|---|---|
| 4,927,227 A | * | 5/1990 | Bensel et al. ................ | 385/135 |
| 5,323,478 A | | 6/1994 | Milanowski et al. | |
| 5,323,480 A | | 6/1994 | Mullaney et al. | |
| 5,481,639 A | | 1/1996 | Cobb et al. | |
| 5,553,186 A | * | 9/1996 | Allen .......................... | 385/135 |
| 5,606,150 A | | 2/1997 | Radliff et al. | |
| 5,613,029 A | | 3/1997 | Burek et al. | |
| 5,631,993 A | * | 5/1997 | Cloud et al. ................ | 385/135 |
| 5,734,776 A | * | 3/1998 | Puetz ........................... | 385/134 |
| 5,835,657 A | | 11/1998 | Suarez et al. | |
| 5,962,811 A | | 10/1999 | Rodrigues et al. | |
| 6,192,180 B1 | | 2/2001 | Kim et al. | |
| 6,249,632 B1 | * | 6/2001 | Wittmeier et al. ........... | 385/135 |
| 6,275,641 B1 | | 8/2001 | Daoud | |
| 6,411,767 B1 | | 6/2002 | Burrous et al. | |
| 6,434,313 B1 | | 8/2002 | Clapp, Jr. et al. | |
| 6,496,640 B1 | * | 12/2002 | Harvey et al. ............... | 385/135 |
| 6,507,691 B1 | | 1/2003 | Hunsinger et al. | |
| 6,539,160 B2 | | 3/2003 | Battey et al. | |
| 6,542,688 B1 | | 4/2003 | Battey et al. | |

(Continued)

FOREIGN PATENT DOCUMENTS

EP 0 657 756 A1 6/1995

*Primary Examiner*—Ryan Lepisto
(74) *Attorney, Agent, or Firm*—Janet A. Kling

(57) ABSTRACT

An enclosure includes a housing defining an internal splicing area and at least one port at least one port configured for passage of at least one telecommunications cable into the enclosure. The enclosure protects the optical fibers, optical fiber splices and optical devices contained therein. A support basket is disposed in the splicing area and extends longitudinally within the housing. The support basket is shaped to substantially conform to a portion of the circumferential shape of the splicing area. A repositionable, removable support platform is disposed on the support basket in a first orientation for storage and disposed in a second orientation for installation and maintenance of the fiber optic splices and optical devices housed in the enclosure. The optical fiber splices and optical devices are disposed in a splice tray which is adjacent to the support platform. Additionally, the support basket includes a multilayer slack storage compartment.

18 Claims, 12 Drawing Sheets

U.S. PATENT DOCUMENTS

| | | |
|---|---|---|
| 6,573,455 B1 | 6/2003 | Badelet |
| 6,778,752 B2 | 8/2004 | Laporte et al. |
| 6,856,747 B2 | 2/2005 | Cloud et al. |
| 7,038,137 B2 | 5/2006 | Grubish et al. |
| 7,045,710 B1 * | 5/2006 | Allen et al. .................. 174/50 |
| 7,141,738 B2 | 11/2006 | Marsac et al. |
| 7,333,706 B2 | 2/2008 | Parikh et al. |
| 2006/0263029 A1 * | 11/2006 | Mudd et al. ................ 385/135 |

\* cited by examiner

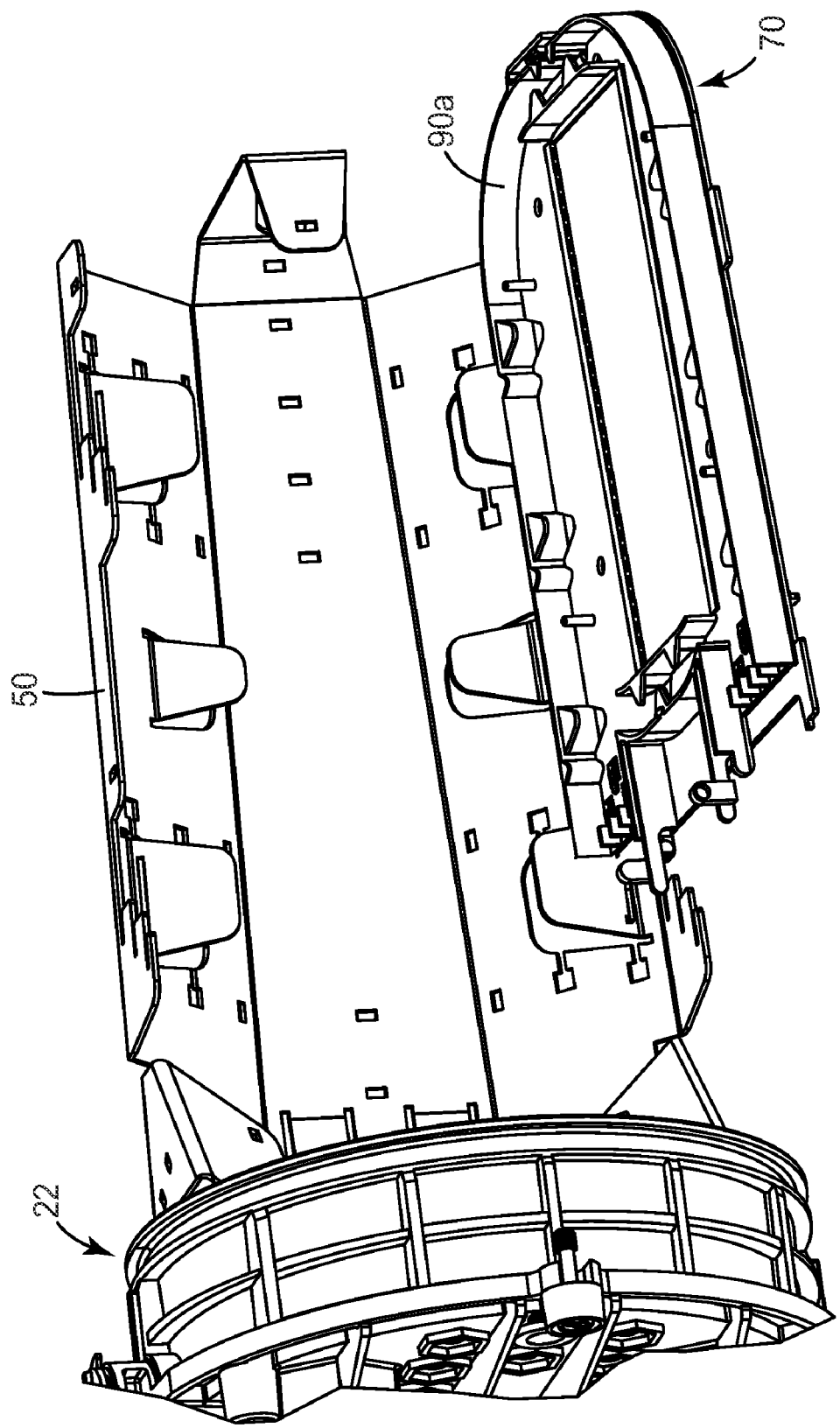

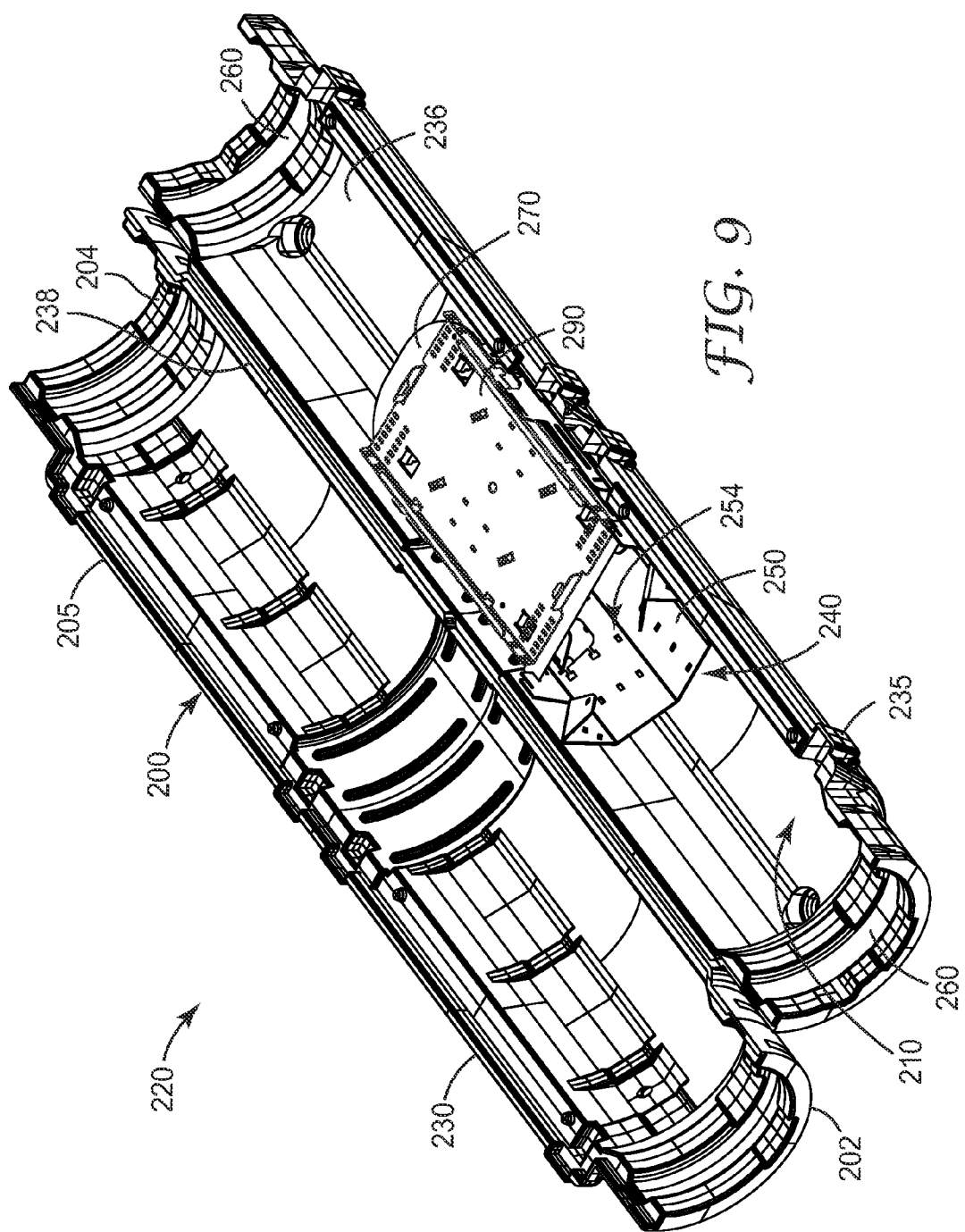

ENCLOSURE AND ORGANIZER FOR TELECOMMUNICATION LINES AND SPLICES

CROSS REFERENCE TO RELATED APPLICATION

This application claims the benefit of U.S. Provisional Patent Application No. 61/022,052, filed Jan. 18, 2008, the disclosure of which is incorporated by reference herein in its entirety.

THE FIELD OF THE INVENTION

The present invention relates generally to enclosures for telecommunications cables. More particularly, the invention relates to enclosures for containing telecommunication lines and telecommunication line splices.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. A telecommunication cable typically includes a bundle of individual telecommunication lines (either optical fibers or copper wires) that are encased within a protective sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual homes, businesses, offices, and so on.

At each point where a telecommunication cable is opened, it is necessary to provide some type of enclosure to protect the exposed interior of the cable. Commonly, the enclosure has one or more ports through which cables enter and/or exit the enclosure. Once inside the enclosure, the cable is opened to expose the telecommunication lines therein. Conventional telecommunication enclosures are constructed to facilitate the management and protection of individual telecommunication lines and splices thereof. For example, conventional enclosures have re-enterable housings and are designed to incorporate splice trays to assist a craftsman in creating a splice connection between two telecommunication lines. Once all required splices are made, the enclosure is secured to protect the opened portion of the cable from moisture, dust, insects, and other hazards.

Conventional telecommunication enclosures may be stand mounted, pole-mounted, buried or housed in a handhole or pedestal. The installation and maintenance of these telecommunication enclosures can be hampered by a lack of workspace as in the case of aerial or pole-mounted enclosures or by the need to have a clean workspace in which to work with the optical fiber cables and optical fiber splices. Thus, a need exists for more craft friendly enclosures which have improved workability in the field.

SUMMARY OF THE INVENTION

In one exemplary embodiment, a cable management assembly for use in a telecommunication enclosure is described. The cable management assembly includes a U-shaped support basket having a multilayer slack storage compartment, a repositionable, removable support platform disposed on the support basket in a first orientation for storage and disposed in a second orientation for installation; and a first splice tray disposed on the support platform.

In another exemplary embodiment, a telecommunication enclosure assembly is described which provides a temporary workbench to facilitate installation and maintenance of the enclosure. The enclosure includes a housing, at least one port and a support basket. The housing protects the optical fibers, optical fiber splices and optical devices contained therein. The housing can have a first end and a second end and can define a splicing area extending in the longitudinal direction between the first end and the second end. The support basket is disposed the splicing area within the housing. The support basket is shaped to substantially conform to a portion of the circumferential shape of the splicing area. A repositionable, removable support platform is disposed on the support basket in a first orientation for storage and disposed in a second orientation for installation and maintenance of the fiber optic splices and optical devices housed in the enclosure. The optical fiber splices and optical devices are disposed in a splice tray which is disposed adjacent to the support platform.

In another exemplary embodiment, an enclosure is described for receiving at least one telecommunications cable and for containing telecommunication lines and telecommunication line splices therein. The enclosure includes a housing, at least one port and a support basket. The housing can have a first end and a second end and can define a splicing area extending in the longitudinal direction between the first end and the second end. The splicing area can have a circumferential shape in a direction transverse to the longitudinal direction. The at least one port may be configured for passage of at least one telecommunications cable into the housing. The support basket may be disposed in the splice area such that the support basket substantially conforms to a portion of the circumferential shape of the splicing area and extends longitudinally within the splicing area of the housing in the enclosed configuration. The support basket includes a multilayer slack storage compartment.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

FIG. 7E is an isometric view showing a splice tray disposed on a support platform attached to the base member in an alternate orientation according to an embodiment of the present invention.

FIG. 9 is an isometric view of an enclosure having a support frame according to an alternative embodiment of the present invention.

Figure 1:
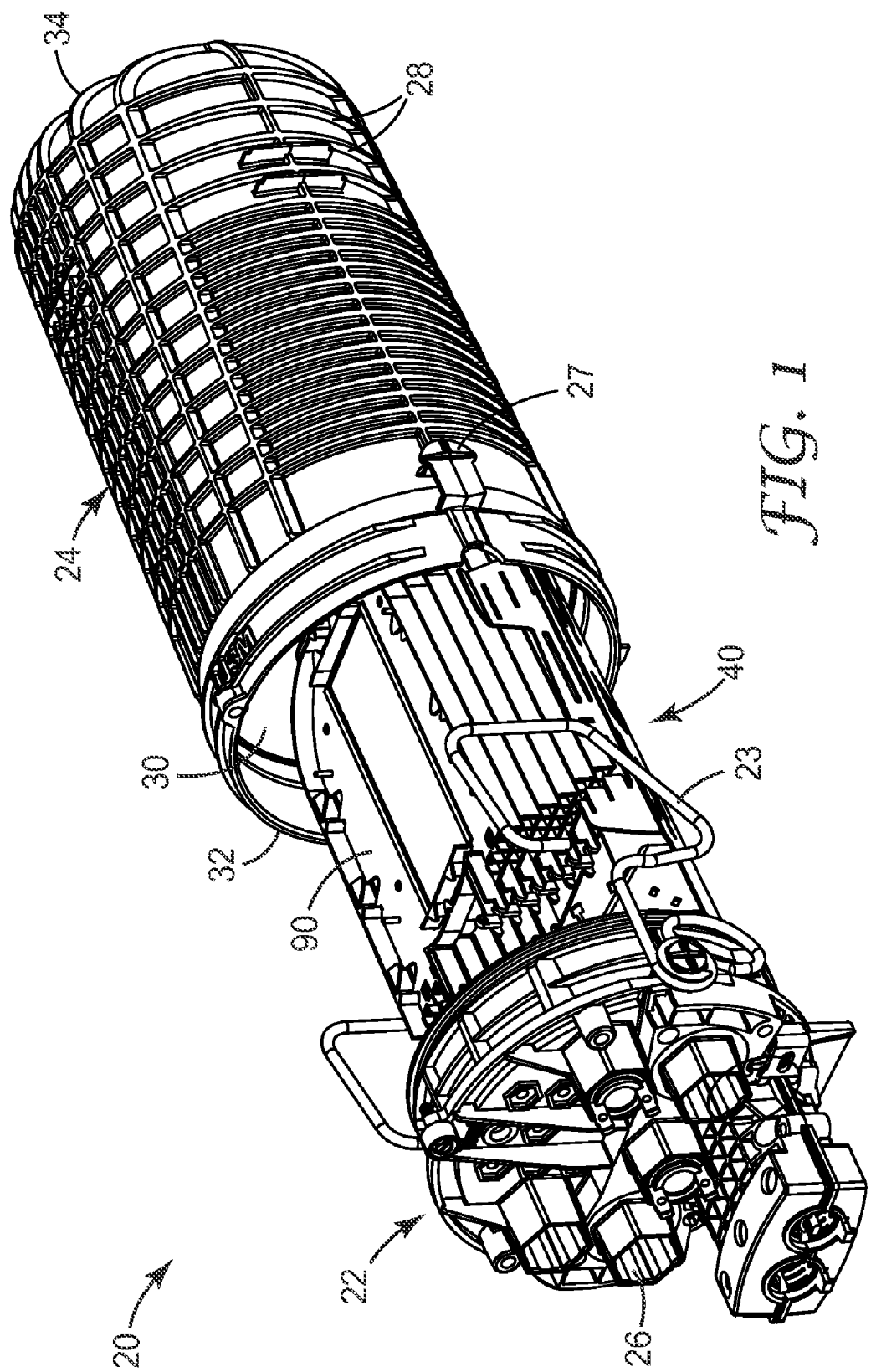
FIG. 1 is an isometric view of an enclosure having a support frame according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying figures. The figures illustrate how specific embodiments of the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

For purposes of clarity, the invention is described herein as used with telecommunication cables or simply "cables" having one or more telecommunication lines therein. However, such use is exemplary only, and it is understood and intended that the present invention is equally suitable for use with other types of cables including, but not limited to, electrical power cables, optical fiber cables, copper wire cables, coaxial cables, drop lines, branch lines, and distribution lines, to name a few. Similarly, the invention is described herein as used with telecommunication line splices, or simply "splices". However, such use is exemplary only, and it is understood and intended that the present invention is equally suitable for use with other types of interconnections including, but not limited to, splices, connectors, hybrid connectors, and optical or electrical components as are known in the art, to name a few.

FIG. 1 shows, an exemplary enclosure 20 according to one embodiment of the invention. The enclosure 20 includes a base member 22 and a housing 24 removeably securable to the base member 22. The base member 22 includes at least one port 26 for receiving a telecommunications cable (not shown). The ports 26 allow passage of a single cable, or multiple cables in combination with a sealing member as is known in the art. The base member 22 may have one, two, or any other number ports 26 as is required for a particular enclosure 20. The housing 24 is hollow and defines a splicing area or longitudinal internal cavity 30 extending from a first end 32 to a second end 34 of the housing 24. The internal cavity 30 has a circumferential shape in a direction transverse to the longitudinal direction. An opening at the first end 32 of the housing 24 is shaped and sized to fit over and engage with the base member 22 in a conventional manner (e.g. engagement of a securing mechanism 23 attached to the base member with protruding knobs 27 located on the exterior surface of the housing). When engaged, the base member 22 and housing 24 provide protection for the internal components of the enclosure 20 from weather, insects and other external hazards. The housing may have external rib members 28 on the outside surface of housing 24 to meet external pressure requirements and satisfy the impact requirements for the enclosure 20. Alternatively, the rib members may be disposed on the internal surface of the housing. The rib members reinforce the housing to strengthen vulnerable portions of the housing to meet external pressure and mechanical shock requirements.

In the exemplary embodiment, the housing 24 and internal cavity 30 therein are substantially circular in transverse cross-section, and the closed second end 34 of the housing 24 is substantially dome-shaped. The base member 22 has a substantially circular cross-section in the transverse direction that matches the shape of the open end of the housing 24. However, in practice, the shapes of the base member 22 and housing 24 are not so limited, and in other embodiments the housing 24 and base member 22 may have other shapes and cross-sections. For example, shape of the transverse cross-section of the housing 24 and base member 22 may be substantially elliptical, rectangular, square, or any other shape as is required or desired for a particular application. The closed second end 34 of the housing 24 may likewise be any suitable shape. In other embodiments, the closed second end 34 of the housing 24 is not monolithically formed with the remainder of the housing 24, as shown in the illustrated embodiment. For example, in other embodiments the housing 24 may comprise an assembly of components, such as a longitudinal hollow body having two open ends, wherein a cap or other similar device is used to form the closed second end 34.

A support frame 40 is secured to the base member 22 by one or more mounting bracket portions 42 (FIG. 4A) extending from the support frame 40. The mounting bracket portions 42 in the illustrated embodiment are configured to be secured to the base member 22 by bolts or screws (not shown). In other embodiments, the support frame 40 may be secured to the base member 22 by any conventional means including, but not limited to bolts, screws, interlocking elements on the support frame 40 and base member 22, adhesive, or any other suitable means. The support frame 40 is shaped to extend longitudinally into the internal cavity 30 of the housing 24 when the enclosure 20 is closed.

In one embodiment, mounting bracket portions 42 are integrally formed with support frame 40, such as by stamping support frame 40 and mounting bracket portions 42 from a single piece of sheet metal, molding the support frame 40 and the mounting bracket portions 42 as a single unit, or overmolding the support frame 40 onto mounting bracket portions 42. In another embodiment, mounting bracket portions 42 are separately formed from support frame 40 and then secured to support frame 40 using any suitable conventional means, such as screws, bolts, welding, adhesive, etc. Optionally, the metal support frame may be painted or powder coated for protection. Alternatively, the support frame may be made of plastic.

As illustrated in FIGS. 1-5, in one embodiment the support frame 40 includes a generally U-shaped support basket 50 having an exterior surface configured to substantially conform to a first portion of the circumferential shape of the internal cavity 30 of housing 24.

For purposes of description, the end of the support basket 50 nearest the base member 22 will be described as being the "bottom" of the support basket 50, while the end of the support basket 50 furthest from the base member 22 will be described as being the "top" of the support basket 50.

In one embodiment, the top 53 of the support basket 50 may be configured to conform to the shape of the closed second end 34 of the housing 24, and so as to aid in containing and protecting telecommunication lines during installation and removal of the housing 24 from the base member 22.

Figure 2:
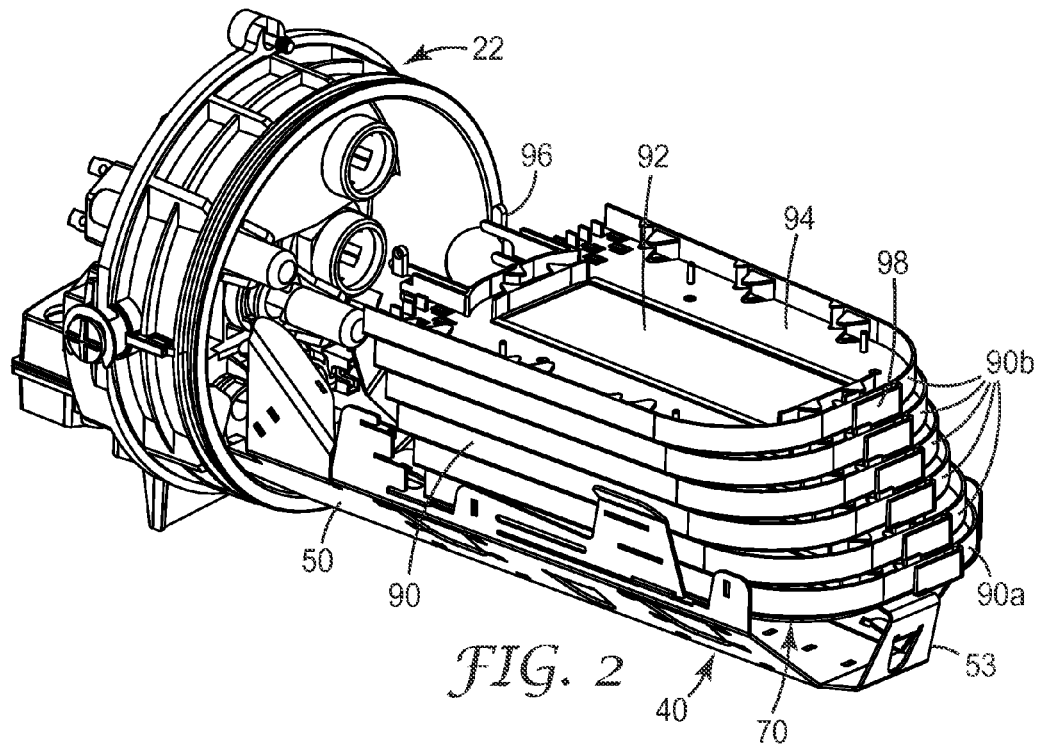
FIG. 2 is an isometric view of the support frame and base member of FIG. 1 showing the support frame filled with splice trays.

The support basket 50 is configured to support, maintain and manage telecommunication lines and splices in several different manners, depending upon the requirements of a particular installation. In one implementation, telecommunication lines and splices may simply be positioned within the interior region 54 of the generally U-shaped support basket 50, without any other type of telecommunication line management features (such as splice trays, excess line holders, optical/electrical components etc.). In other implementations, telecommunication line management features are used with and incorporated into the support basket 50. For example, the illustrated support basket 50 may be used with different types of splice trays. In particular, the support basket 50 may be used to support a plurality of splice trays 90 (see e.g. FIG. 2, showing multiple splice trays 90a and 90b).

Figure 4A:
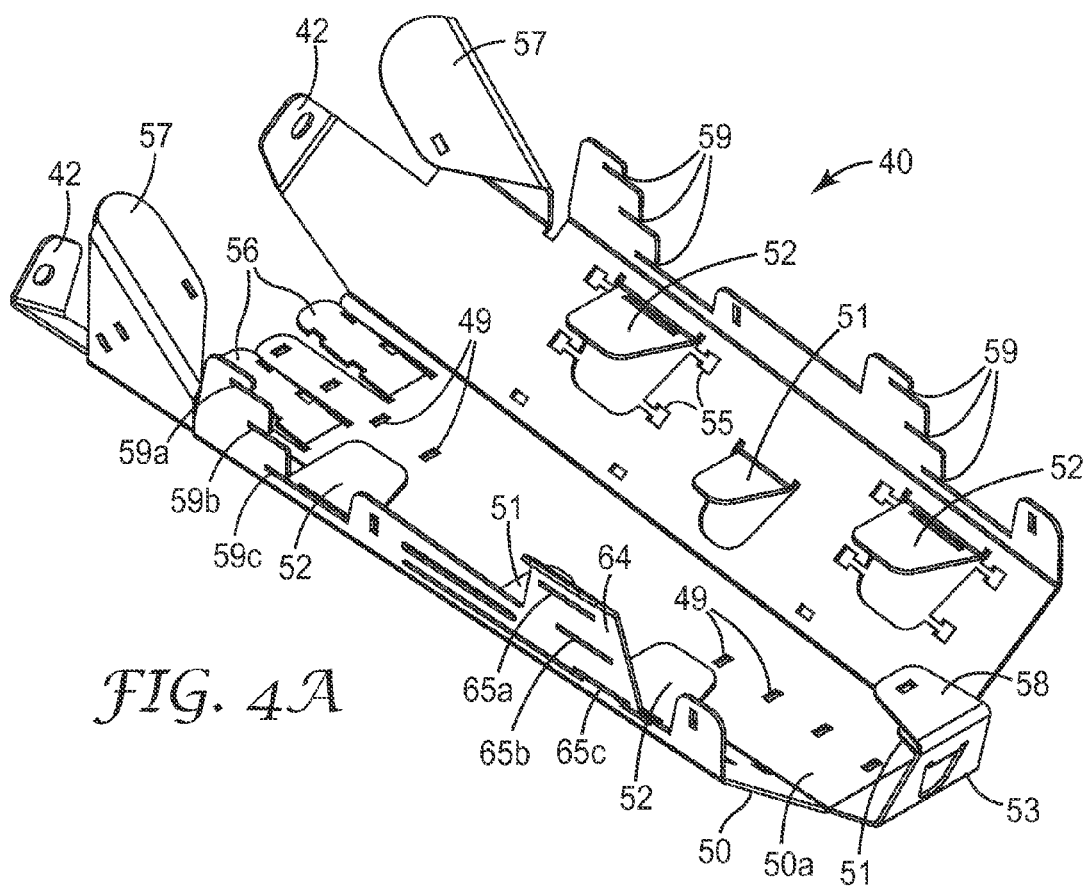
FIG. 4A is an isometric view of the support frame according to an embodiment of the present invention.
Figure 4B:
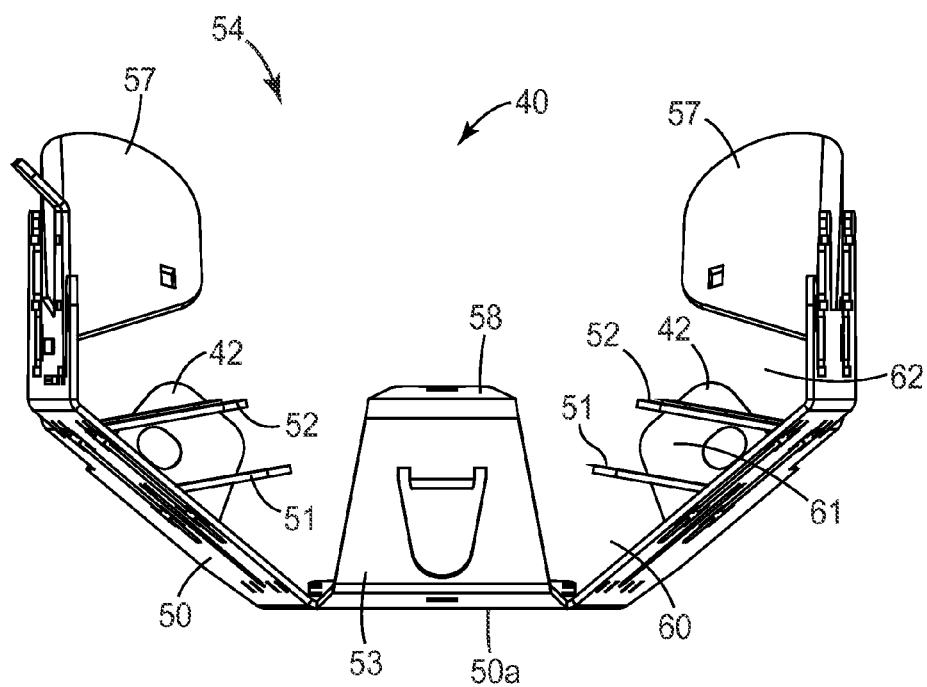
FIG. 4B is an end view of the support frame of FIG. 4A.

Referring to FIGS. 4A and 4B, support basket 50 may be provided with plurality of tabs 51, 52 that protrude into the interior region 54 of the support basket 50. The tabs segment the support basket into a plurality of slack storage layers 60-62. The first slack storage layer 60 is positioned between a wall portion 50a of support basket 50 and the first tabs 51. The second slack storage layer 61 is positioned between the first tabs 51 and second tabs 52. An optional third slack storage layer 62 is positioned above the second tabs 52 and splice trays 90. Having segmented or multi-layer slack storage compartments provides more efficient management of incoming and outgoing fibers. For example, main express optical ribbon fibers from distribution cables can be stored in the first slack storage layer 60 under the first tabs 51. Optical ribbon fiber loops or fibers in the transition tubing can be managed and tied to the basket using simple tie wraps (not shown) which can be secured to the support basket 50 by slipping the tie wraps through one or more openings 49 in the basket. The branch cable loose buffer tubes can be stored in the second slack storage layer 61 using simple tie wraps inserted through openings in the sides of the basket or the T-shaped slots 55 shown in FIG. 4A.

Support basket 50 may be provided with cable strain relief tie downs 56 on the bottom side of the basket. Entering distribution cables may be secured to the cable strain relief tie downs to transition the cable or central tubes into the basket and to provide strain relief to the cables.

Support basket 50 may be provided with wings 57 to guide cables or ribbons entering through ports 26 (FIG. 6A) into the slack storage portion of the basket.

Additionally, support basket 50 may include a protective hook 58 at the top 53 of the support basket to ensure that all of the fibers are contained in the slack storage area when the housing is placed over the basket and is installed onto the base member to prevent pinching or damaging the cables. A first tab 51a (FIG. 5) may extend from protective hook 58 in to the interior region 54 of the basket to separate the first slack storage layer from the second slack storage area in this region of support basket 50.

Support basket 50 may also include at least one set of staggered notches 59 along each longitudinal edge of the support basket. Three staggered notches 59a-59c are shown in exemplary embodiment shown in FIG. 4A. The embodiment in FIG. 4a also shows a flexible arm 64 having a series of slots 65a-65c which correspond to the staggered notches 59a-59c. The staggered notches and the slots may be used to position a support platform 70 (FIG. 5) to the support basket 50. The support platform 70 serves as a mounting plate to secure a plurality of splice trays 90 to the support basket 50.

Figure 5:
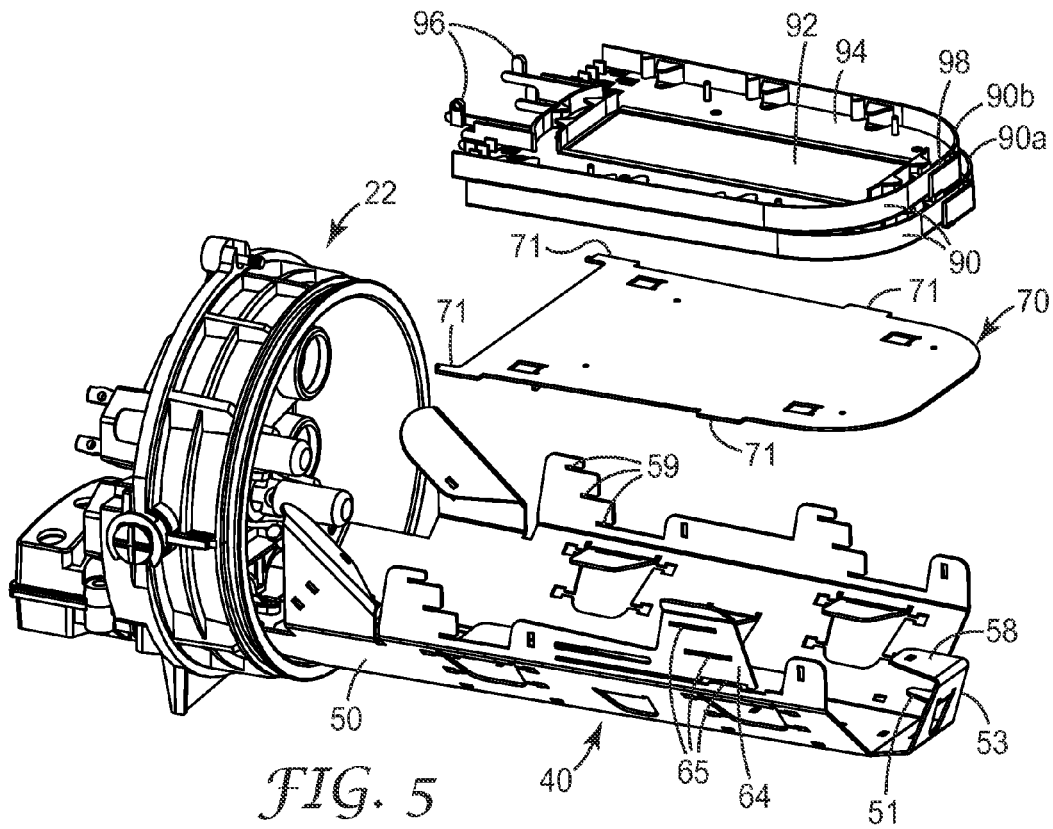
FIG. 5 is a partially exploded isometric view showing the support frame attached to the base member, a support platform and a plurality of hinged splice trays according to an embodiment of the present invention.

Referring to FIG. 5, the support platform 70 includes a plurality of ears 71 extending from the support platform which may be slipped into the staggered notches 59 and the slots 65 on flexible arm 64. Flexible arm locks the support platform 70 into place within the support basket 50. To remove the support platform 70 from the support basket 50, the flexible arm 64 can be pushed away from the support platform to provide enough clearance for the ears 71 to be removed from the staggered notches 59 and slot 65 on the flexible arm 64.

Figure 6A:
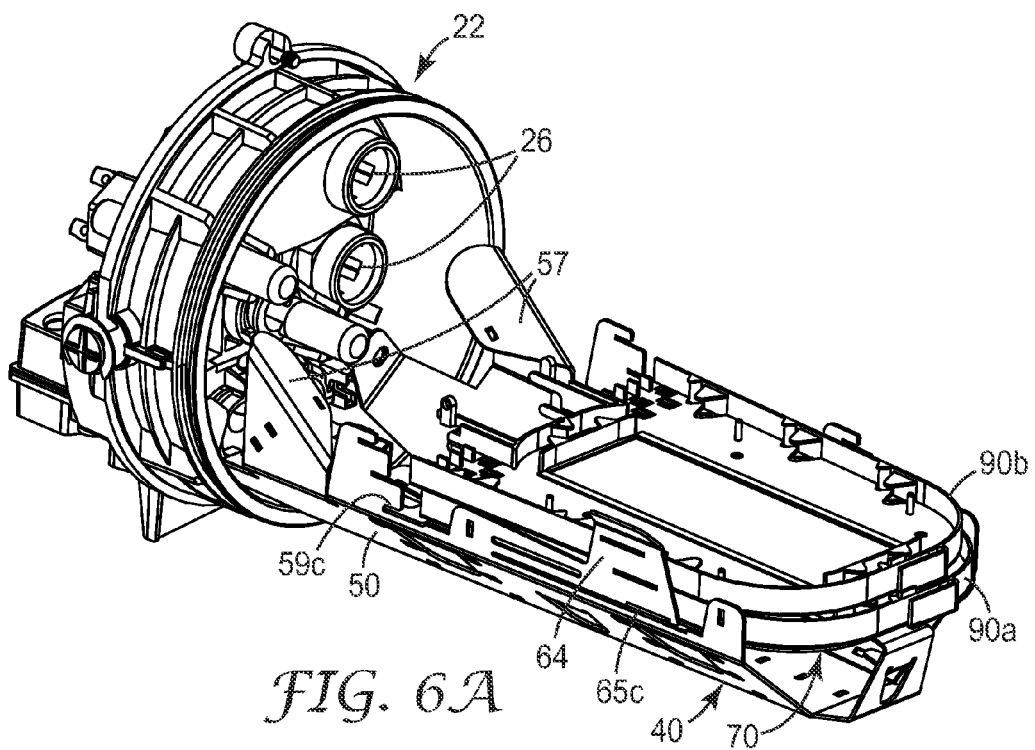
FIG. 6A is an isometric view showing the support platform and plurality of hinged splice trays mounted in the support frame in a first position in a first orientation according to an embodiment of the present invention.
Figure 6B:
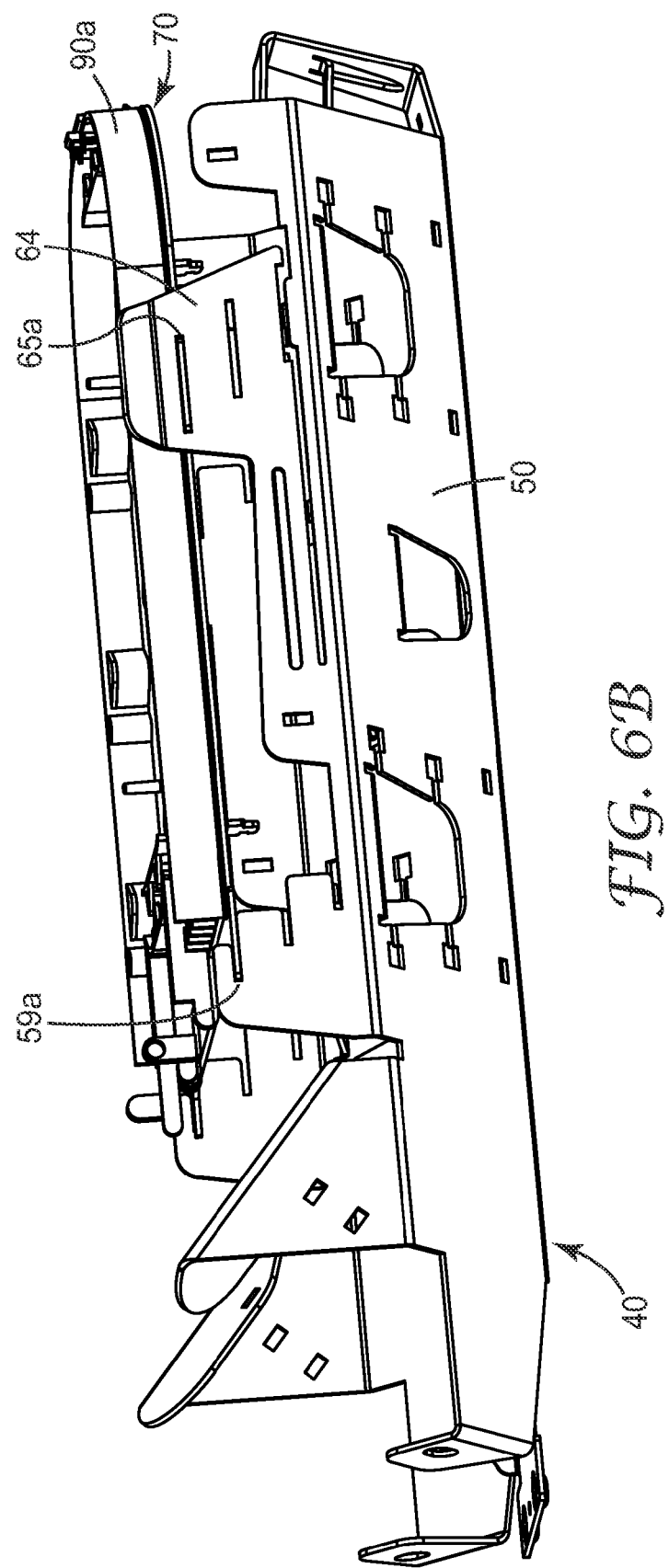
FIG. 6B is an isometric view showing the support platform and splice tray mounted in the support frame in an alternative position according to an embodiment of the present invention.

The repositionability of the support platform allows the installer to balance the need for increased slack storage with a need for greater splicing capacity. For example, support platform 70 can be placed in a first position in upper notch 69A and upper slot 65a, in a second position in middle notch 59b and middle slot 65b, or in a third position in lower notch 59c and upper slot 65c. Greater storage capacity is available when the support platform 70 is installed at its first position (i.e. in notches 59a and slot 65a) as shown in FIG. 6B. Increased slack storage space is useful in applications in which high fiber count cables are used. Alternatively, more splice trays 90a, 90b can be accommodated in the enclosure when the support platform 70 is installed in its third position (i.e. notches 59c and slot 65c) as shown in FIG. 6A.

The splice trays 90 can be supported by the support platform 70. A first splice tray 90a may be attached to the support platform by a conventional fastener, such as an adhesive, tape or mechanical connection (e.g. screws, rivets, hook and loop fastener, etc.). The remaining splice trays 90b may then either stacked on top of the first splice tray 90a, be pivotally attached to the first splice tray or be pivotally attached to the splice tray directly beneath it in the stack.

Figure 3:
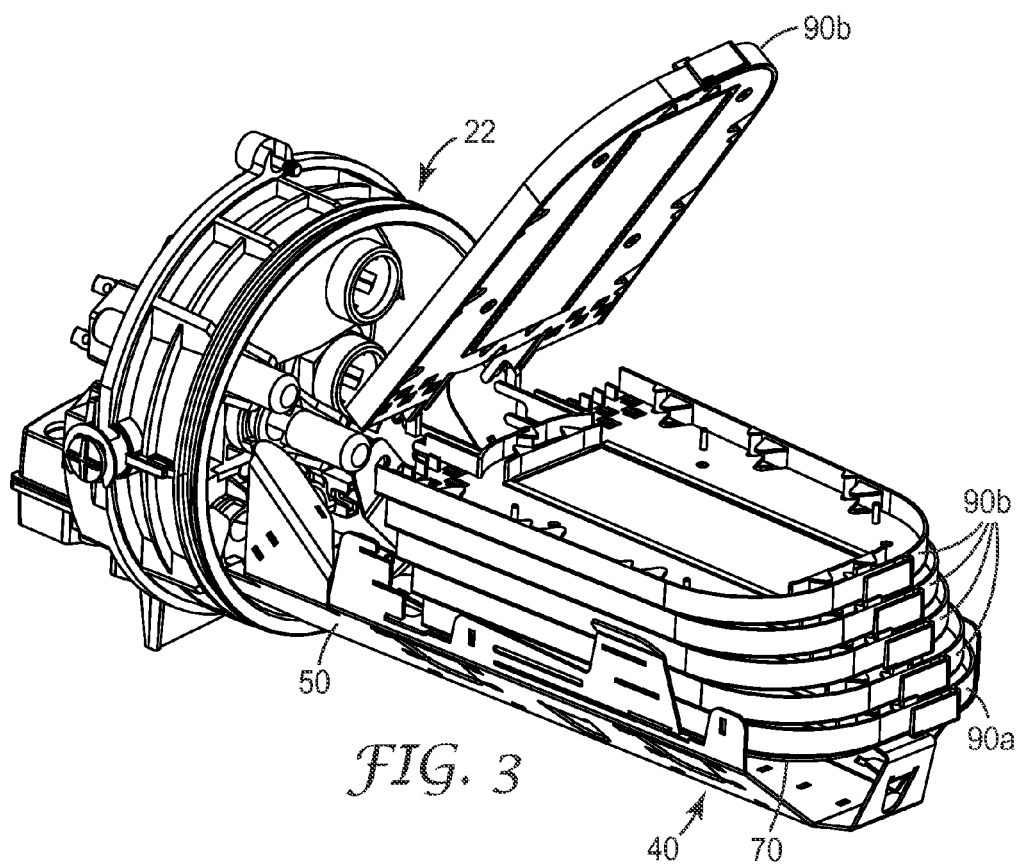
FIG. 3 is an alternative isometric view of the support frame and base member of FIG. 1 showing the support frame filled with splice trays.

FIGS. 2 and 3 show a plurality of self stacking hinged splice trays 90a, 90b. An exemplary embodiment of a splice tray usable with the current enclosure system is described relative to FIGS. 2, 3, 8A and 8B. Each splice tray includes a splicing area 92 along its longitudinal central axis and a fiber routing area 94 around the interior circumference of the splice tray. An optional cover 99 may be fitted to each splice tray after the splices and fibers have been installed. Each of splice trays 90b is pivotally mounted to the splice tray beneath it by a hinging mechanism 96. Additionally, each of the splice trays may have a latch 98 at an end opposite the hinging mechanism 96 to lock the tray in a closed position relative to the tray beneath it. FIG. 2 shows all of the splice trays 90a, 90b in a closed configuration and FIG. 3 shows the splice trays with the top tray pivoted to an open position to provide access to the second tray in the stack.

The splice area 92 can accommodate conventional splice inserts 93. Splice inserts may be configured to support one or more fusion splices, one or more mechanical splices, a mixture of fusion and mechanical splices and/or one or more optical devices. Conventional splice holder inserts are commercially available as 3M™ FIBRLOK™ Splice Inserts 2521-FL; 3M™ FIBRLOK™ MULTIFIBRLOK™ SPLICE INSERTS 2521-MF; and 3M™ FUSION SPLICE INSERT 2-PACK 2521-F available through 3M Company, St. Paul, Minn., USA, for example. Optical devices can also be accommodated in the splice area and can include active optical devices such as a triplexer, a laser, a transmitter, a receiver, and a photodiode or a passive optical devices such as a fan out device, an optical splitter, an optical coupler, a wave division multiplexer device, a coarse wave wavelength division multiplexer, a dense wavelength division multiplexer, a optical switch and an optical attenuator. Alternatively, fusion splice or mechanical splice holders may be formed integrally with the splicing tray. Additional integral optical device holders may also be formed on the splice trays.

Figure 8A:
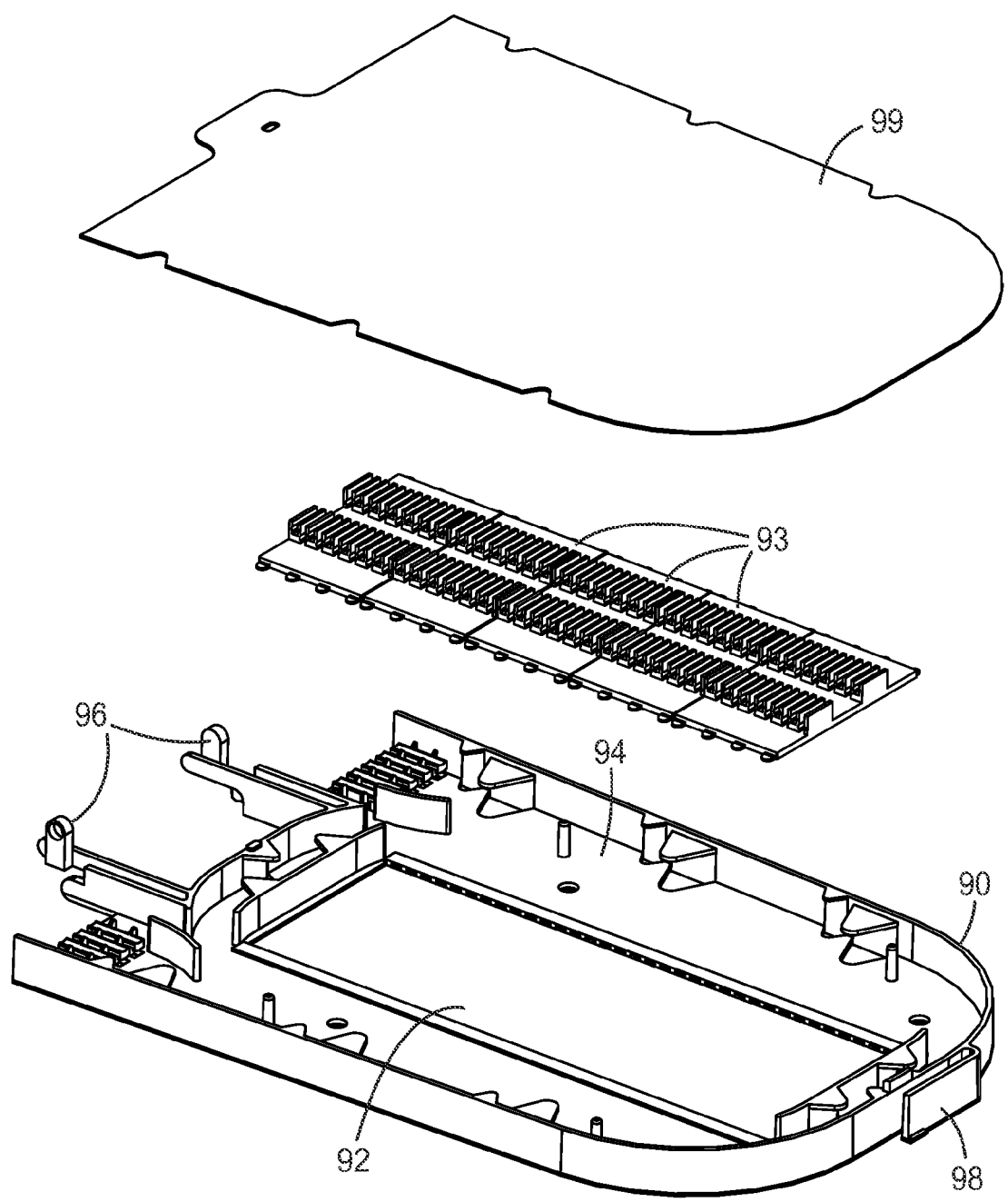
FIG. 8A is an exploded isometric view of an exemplary splice tray according to an embodiment of the present invention.
Figure 8B:
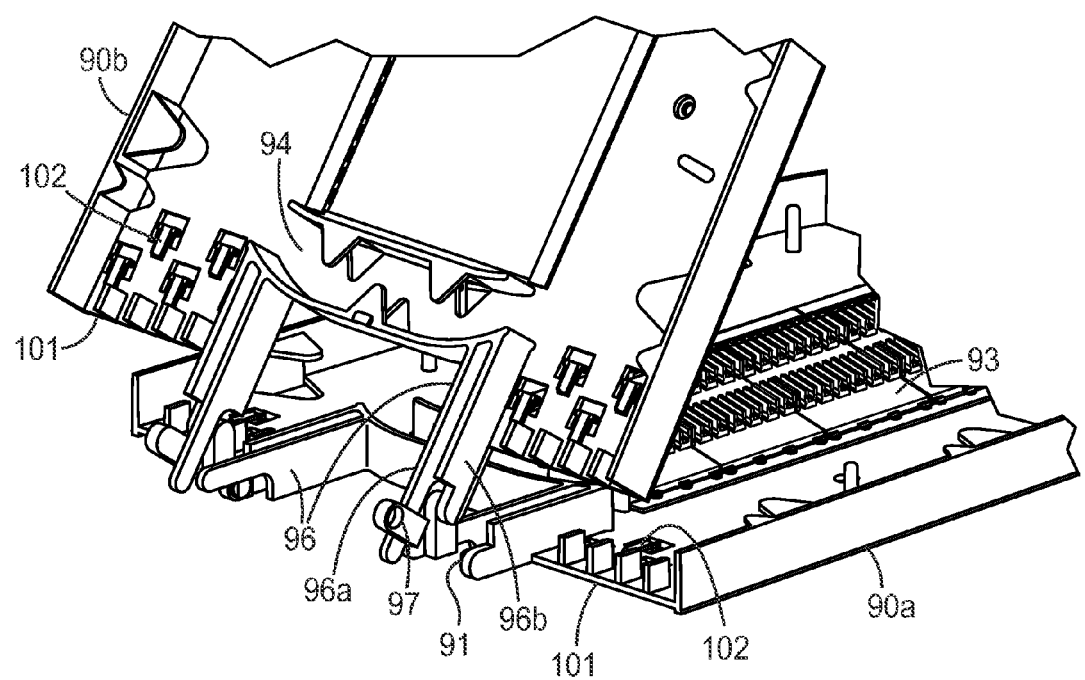
FIG. 8B is a close-up isometric view of the hinge region of two pivotally connected splice trays according to an embodiment of the present invention.

FIG. 8B shows a detail view of the hinging mechanism 96 of the exemplary splice trays 90a, 90b. The hinging mechanism 96 includes a first leg 96a and a second leg 96b. The first leg 96a is slightly longer than the second leg 96b. This configuration allows the trays to be offset from one another when stacked and allows free access to the tray beneath it when a tray is opened. The first leg 96a has a pivot recess 97 formed on the end thereof. The second leg 96b has a pivot projection 91 formed on the end thereof to engage the pivot recess 97 of the tray beneath it.

The exemplary splice tray shown in FIG. 8B shows an optional raised tie down feature 102 integrally formed in the cable entry region 101 of the splice tray 90a, 90b. The raised tie down feature 102 can secure a cable or buffer tube to the splice tray for strain relief without having to a thread cable tie through a set of orifices or parallel holes in this potentially congested region of the splice tray.

In addition, support platform 70 may be removed from the support basket and reattached in a second orientation to form a work bench for the craftsman to use during the initial installation and maintenance of the enclosure. This repositionability can be useful when the enclosure is mounted on a strand and there is very little workspace available. Alternatively, this can also be useful when working on a sub-grade enclosure where cleanliness is an issue. Positioning the support platform in the second orientation or workbench orientation allows the craft to work in the enclosure and splice trays without having to set the splice trays on the ground or moving the entire enclosure into a truck.

Figure 7A:
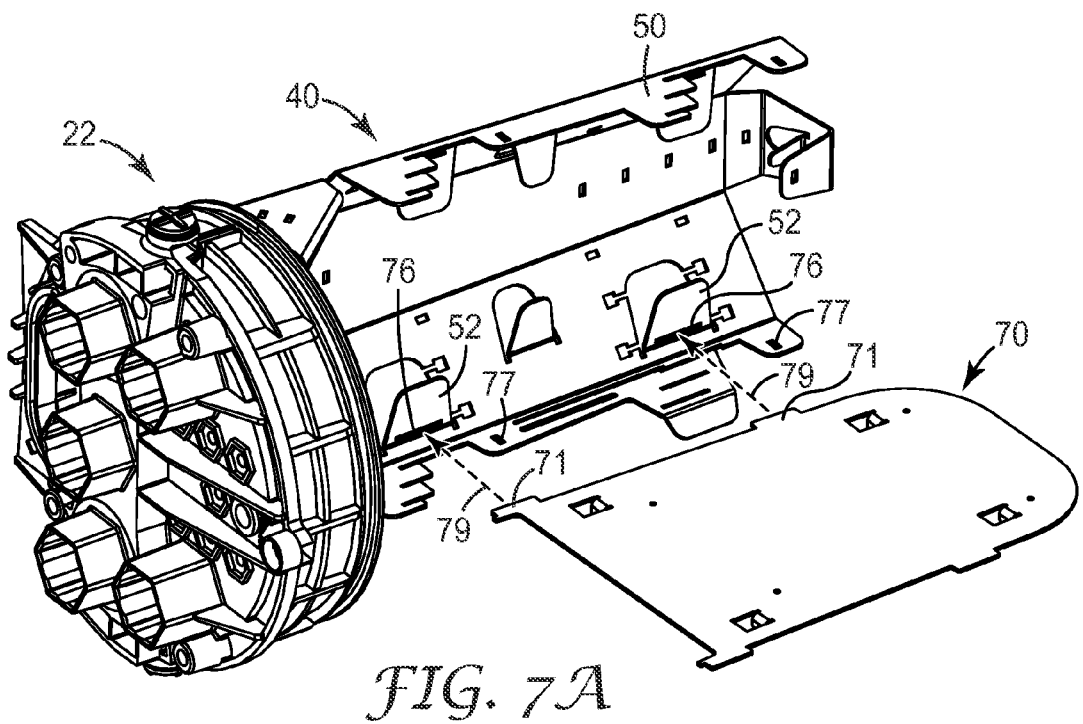
FIG. 7A is a partially exploded isometric view showing the support frame attached to the base member and a support platform in an alternate orientation according to an embodiment of the present invention.
Figure 7B:
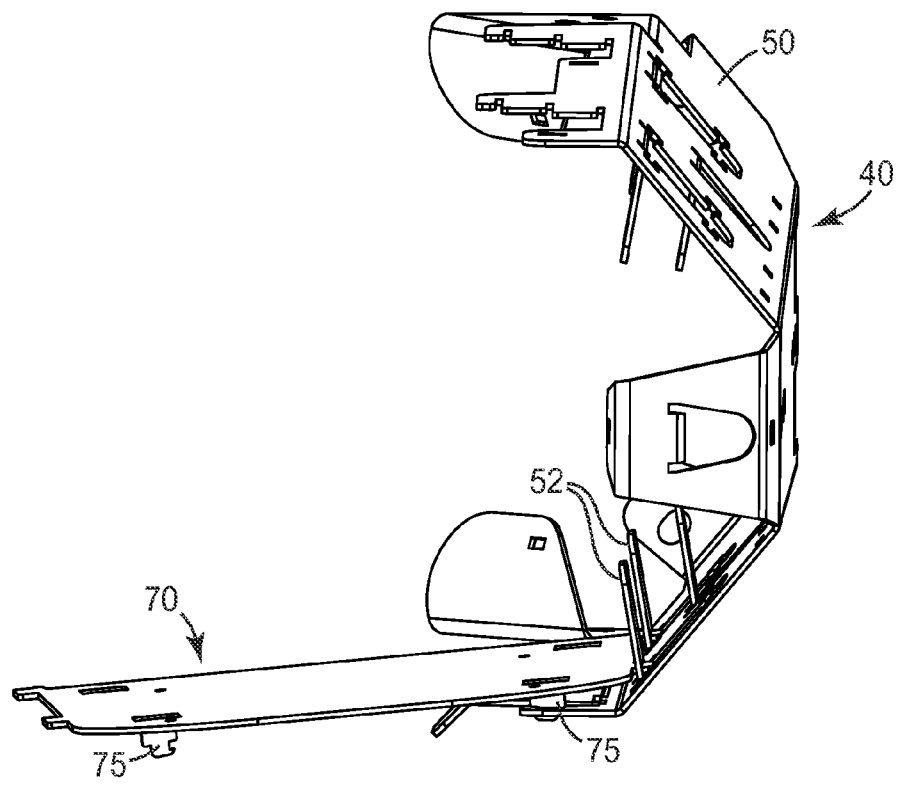
FIG. 7B is an isometric view showing the support platform attached to the support basket in an alternate orientation according to an embodiment of the present invention.
Figure 7C:
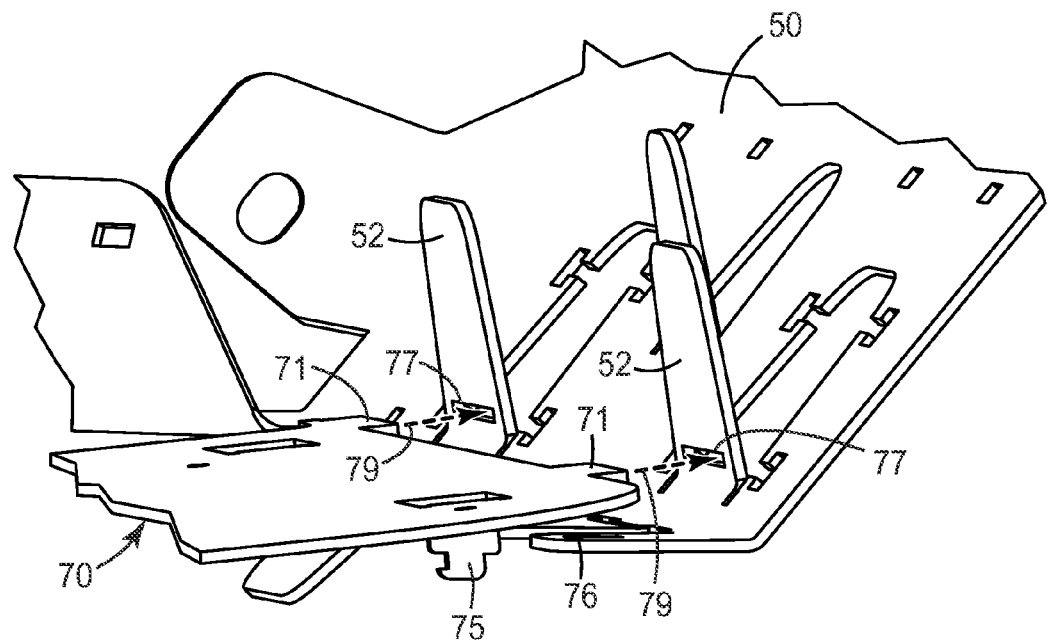
FIG. 7C is a close-up isometric view showing the support platform prior to being attached to the base member in an alternate orientation according to an embodiment of the present invention.
Figure 7D:
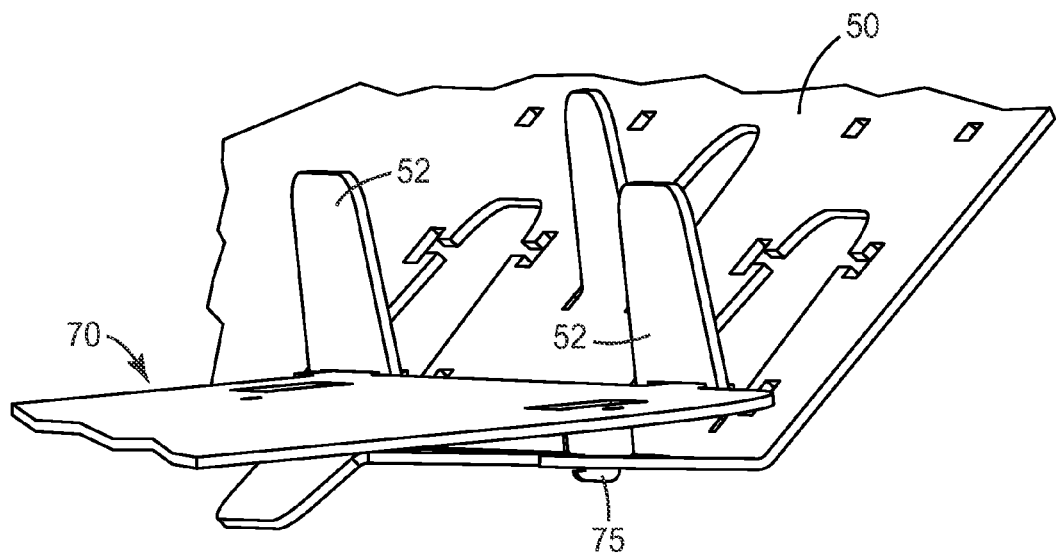
FIG. 7D is a close-up isometric view showing the support platform after being attached to the base member in an alternate orientation according to an embodiment of the present invention.

For example, referring to FIGS. 7A-7E, the support basket 50 may be rotated such that the U-shaped portion of the basket is sitting on one of the sides of the U as shown in FIG. 7A. FIG. 7A shows the installation of the support platform in the workbench orientation. FIG. 7B shows a support platform in the final work bench configuration and 7E shows the support platform in the final work bench configuration with a splice tray 90a attached to the support platform. In particular, support platform 70 can have a plurality of mounting clips 75 that extend from the side opposite where the splice tray is mounted. Two of these mounting clips 75 may be engaged with holes 77 in the support basket at the same time that the two ears 71 closest to the mounting clips engage with slits 76 in the second tabs 52 of support basket 50. The ears 71 are fully inserted into slits as shown by arrows 79 in FIG. 7C. The mounting clips 75 are fitted into the holes 77. Finally, the support platform 70 is nudged away from the support basket 50 to lock the support platform in the workbench orientation. The craftsman can then have full access to the splice trays. Once the work is completed, the workbench may be removed by nudging the support platform 70 toward the support basket 50 to allow the mounting clips 75 to release from holes 77. Once the mounting clips have been released the ears 71 on the support platform can be removed from the slits 76 by pulling the support platform 70 away from the support basket 50. The support basket 50 can be moved into is normal orientation as shown in FIG. 5. After any residual cable slack is stowed in one of the slack storage layers, the support platform 70 may be replaced in its first or storage orientation by inserting the ears 71 on the support platform into the notches 59 and slot 65 in flexible arm 64.

FIG. 9 depicts an alternative telecommunication enclosure having a support frame according to an embodiment of the present invention. The illustrated enclosure may be a free-breathing aerial enclosure such as a 3M™ SLiC™ Fiber Aerial Closure 533 or the splice closure section of a 3M™ SLiC™ Fiber Aerial Terminal Closure 530 available from 3M Company, St. Paul, Minn.

The telecommunication enclosure 220 comprises a housing 200 which may be opened along an edge or opening seam 205, having mating ridges and grooves to form a labyrinth-type seal for restricting the ingress of dirt, water, bugs, and the like, into housing 200. Generally, housing 200 comprises first and second casing sections 230, 235 that are rotatably connected to one another along a hinge line 238. In one embodiment according to the invention, hinge line 238 may be a compression molded living hinge that is integral with casing sections 230, 235. Preferably, housing 200 may be molded from a suitable polymer material, such as polyethylene or the like using a conventional molding technique, such as blow molding, or injection molding. As shown, each substantially cylindrical casing section 230, 235 may be approximately one half of housing 200.

As seen in FIG. 9, housing 200 has an elongated, substantially cylindrical shape that extends longitudinally between first and second opposite ends 202, 204. End seals (not shown) may be disposed in seal grooves 260 at the first and second ends 202, 204 of housing 200. The end seals can have ports to accommodate the passage of fiber optic cables in and out of the telecommunication enclosure.

The casing sections 230, 235 define a splice area 210 within housing 200. The splicing area 210 has a circumferential shape in a transverse direction to the longitudinal direction of housing 200. Access to the splicing area may be facilitated by the rotational position of first casing section 230 (in the upper position) relative to second casing section 235 (in the lower position). In particular, first and second casing sections 230, 235 of housing 200 are oriented such that when housing 200 is opened, a substantially unobstructed view is provided into the splice area 210 within housing 200.

A support frame 240 is secured to an inner wall 236 of the second casing section 235 by bolts or screws (not shown) and extends longitudinally within the splicing area 210 of housing 200. In other embodiments, the support frame 240 may be secured to the casing section 235 by any conventional means including, but not limited to bolts, screws, interlocking elements on the support frame 240 and casing section 235, adhesive, or any other suitable means. The support frame 240 may be shaped to extend longitudinally within the splicing area 210 of the housing 200 when the enclosure 220 is closed.

As illustrated in FIG. 9, in one embodiment support frame 240 includes a generally U-shaped support basket 250 having an exterior surface configured to substantially conform to the inner circumferential shape of splicing area 210 of housing 200.

The support basket 250 is configured to support, maintain and manage telecommunication lines and splices in several different manners, depending upon the requirements of a particular installation. In one implementation, telecommunication lines and splices may simply be positioned within the interior region 254 of the generally U-shaped support basket 250, without any other type of telecommunication line management features (such as splice trays, excess line holders, optical/electrical components etc.). In other implementations, telecommunication line management features are used with and incorporated into the support basket 250. For example, the illustrated support basket 250 may be used with different types of splice trays. In particular, the support basket 250 may be used to support at least one stackable splice tray 290 which are disposed on support platform 270. Support basket 250 may have the features of the previously described support basket 50 (FIGS. 1-8) including the features that allow the installer to balance the need for increased slack storage with a need for greater splicing capacity as well as the segmented or multi-layer slack storage compartments to provide more efficient management of incoming and outgoing fibers.

FIG. 9 shows the support platform 270 mounted in a first orientation on the support basket 250 for storage. The support platform 270 may be removed from the support basket 250 as previously described and reattached in a second orientation to form a work bench for the craftsman to use during the initial installation and maintenance of the enclosure.

Figure 10:
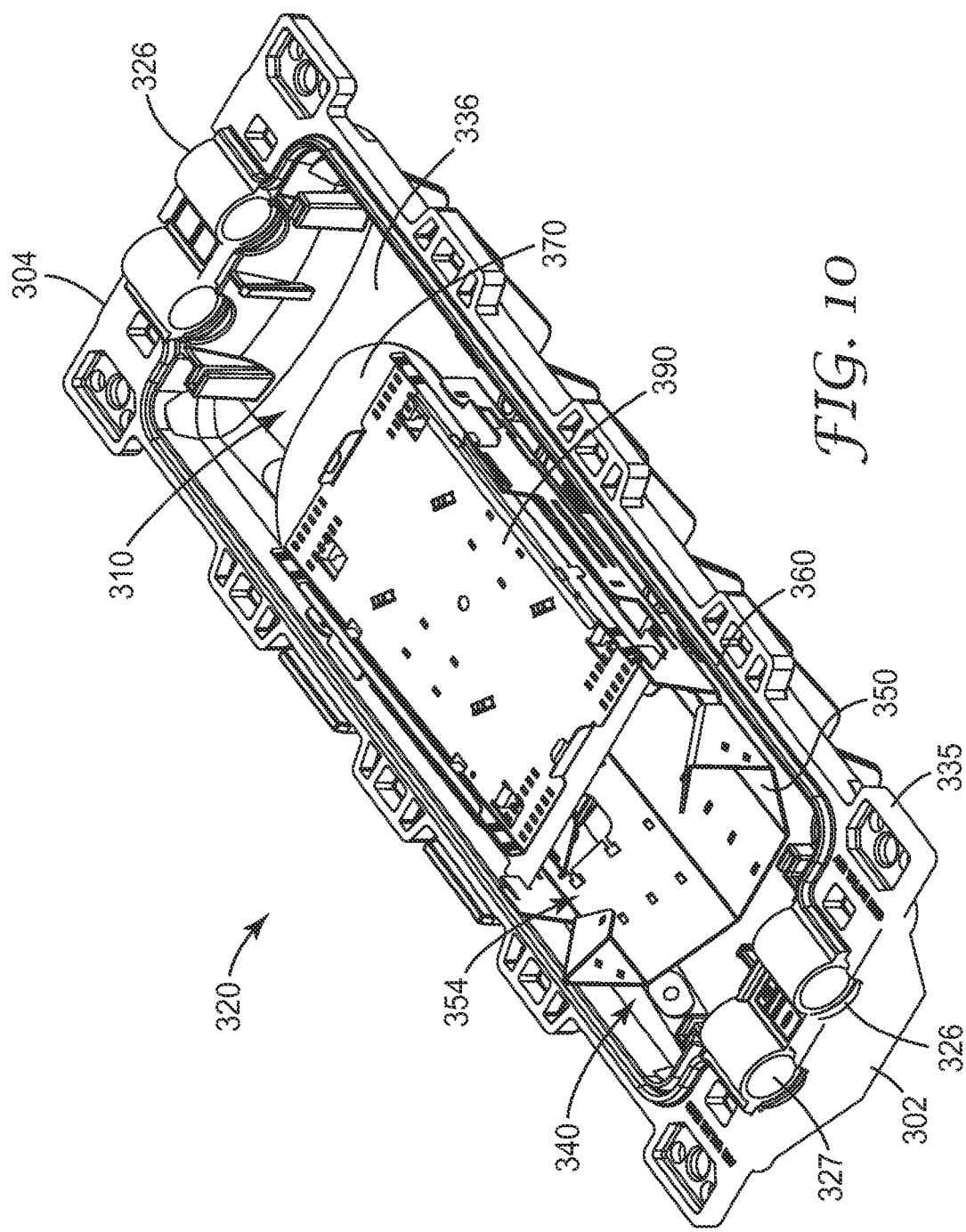
FIG. 10 is an isometric view of an enclosure having a support frame according to another alternative embodiment of the present invention.

FIG. 10 depicts another alternative telecommunication enclosure having a support frame according to an embodiment of the present invention. The illustrated enclosure may be a sealed, bolted enclosure such as a 3M™ Fiber Optic Splice Closure 2178-S available from 3M Company.

The telecommunication enclosure 220 comprises a housing having separable a first casing section (not shown) and a second casing section 335 that extend longitudinally between first and second opposite ends. The casing sections when brought together define entry ports 326 at each end of the enclosure. Entry ports 326 allow passage of a single cable, or multiple cables in combination with sealing member (not shown). Enclosure 320 is illustrated in FIG. 10 as an in-line style enclosure with two entry ports 326 on the first end 302 of enclosure 320 and two entry ports 326 on the second end 304 of enclosure 320. In other embodiments of an inline enclosure, the enclosure may have one, two, or any other number entry ports 326 on each end of the enclosure. Alternatively, the enclosure may be a butt-style enclosure having a desired number of ports on only one end of the enclosure. Although illustrated as completely separable in FIG. 10, in other embodiments the first casing section and the second casing section may be moveably engaged, as by a hinge or the like.

Enclosure 320 may be formed from any suitable material. Suitable materials may include, for example, polymeric materials, sheet metal, and cast metal, to name a few. Material selection will depend upon factors including, but not limited to, chemical exposure conditions, environmental exposure conditions including temperature and humidity conditions, and flame retardancy requirements, to name a few.

A sealing gasket 360 is positioned between the first casing section (not shown) and the second casing section 335 to form a seal against the ingress of moisture, dust, insects, and the like into enclosure 320 when the first casing section and the second casing section are joined together, as by locking bolts, clamping members, and so on. Gasket 360 includes entry port portions 327 that surround the circumference of each entry port 326, so as to maintain the continuity of the gasket and resulting seal around the periphery of the enclosure 320. In one embodiment, entry port portions 327 may include longitudinal slits (not shown) extending therethrough to permit the entry port portion 327 of gasket 360 to be opened and a sealing member (not shown) to be laid therein. Gasket 360 may be formed of a resilient material such as thermoplastic elastomers, vulcanite rubbers, polyurethane foams, reactive and non-reactive polymers, silicones, ethylene propylene diene monomer (EPDM) rubbers, and soft plastics, to name a few.

The first casing section and the second casing section 335 define a splice area 310 within the housing of enclosure 320. The splicing area 310 has a circumferential shape in a transverse direction to the longitudinal direction of the housing. Access to the splicing area may be facilitated by separation and removal of first casing section (not shown) from the second casing section 335. In particular, the first casing section and the second section 335 of enclosure 320 are oriented such that when enclosure 320 is opened, a substantially unobstructed view is provided into the splice area 310 within enclosure 310.

A support frame 340 is secured to an inner bottom wall 336 of the second casing section 335 by bolts or screws (not shown) and extends longitudinally within the splicing area within the splicing area 310 in the housing of enclosure 320. In other embodiments, the support frame 340 may be secured to the casing section 335 by any conventional means including, but not limited to bolts, screws, interlocking elements on the support frame 340 and casing section 335, adhesive, or any other suitable means. In another embodiment, the support basket may be attached to a bracket which is in turn attached to an inner bottom wall of the second casing section. Alternatively, the support basket may be suspended between a pair of mounting rails (not shown) that are connected to second casing portion at the first and second ends of the enclosure. The support frame 340 is shaped to extend longitudinally within the splicing area 310 of the enclosure 320 is closed.

As illustrated in FIG. 10, the support frame 340 includes a generally U-shaped support basket 350 having an exterior surface configured to substantially conform to the circumferential shape of splicing area 310 of enclosure 320.

The support basket 350 is configured to support, maintain and manage telecommunication lines and splices in several different manners, depending upon the requirements of a particular installation. In one implementation, telecommunication lines and splices may simply be positioned within the interior region 354 of the generally U-shaped support basket 350, without any other type of telecommunication line management features (such as splice trays, excess line holders, optical/electrical components etc.). In other implementations, telecommunication line management features are used with and incorporated into the support basket 350. For example, the illustrated support basket 350 may be used with different types of splice trays. In particular, the support basket 350 may be used to support at least one stackable splice tray 390 which may be disposed on support platform 370. Support basket 350 may have the features of the previously described support basket 50 (FIGS. 1-8) including the features that allow the installer to balance the need for increased slack storage with a need for greater splicing capacity as well as the segmented or multi-layer slack storage compartments to provide more efficient management of incoming and outgoing fibers.

FIG. 10 shows the support platform 370 mounted in a first orientation on the support basket 350 for storage. The support platform 370 may be removed from the support basket 350 as previously described and reattached in a second orientation to form a work bench for the craftsman to use during the initial installation and maintenance of the enclosure.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A cable management assembly for use in a telecommunication enclosure, the assembly comprising:
   a U-shaped support basket having a multilayer slack storage compartment, wherein the support basket comprises a plurality of staggered notches on opposing longitudinal edges of the support basket and a flexible arm including a plurality of slots which correspond to the staggered notches;
   a repositionable, removable support platform disposed on the support basket; and
   a first splice tray disposed on a side of the support platform and repositionable with the support platform, wherein the support platform is positionable in a first orientation on the support basket for storage of one or more telecommunication cables and in a second orientation for installation of the one or more telecommunication cables to form a work bench.

2. The assembly of claim 1, further comprising a second splice tray wherein the second splice tray can be one of a hinged splice tray that is pivotally attached to the first splice tray and a stackable splice tray disposed on the first splice tray.

3. The assembly of claim 1, further comprising a component insert disposed on the first splice tray, wherein the component insert can hold at least one of a fusion splice, a mechanical splice, 1×N fiber optic splitters, 2×N fiber optic splitters, WDM components, CWDM components, and a combination thereof.

4. The assembly of claim 1, wherein the support platform further comprises a plurality of ears extending from edges thereof, wherein the ears are engageable with the notches on the support basket and the slots on the flexible arm to place the support platform at one of multiple heights within the support basket.

5. The assembly of claim 1, wherein the support platform further comprises a plurality of ears extending from edges thereof and a plurality of mounting clips projecting from a side opposite the side carrying the splice tray.

6. The assembly of claim 5, wherein the support platform is installed in a second orientation by inserting the ears of the support platform into slits formed in the support basket and the mounting clips into holes in the support basket, wherein the support platform is positioned outside an interior region of the support basket.

7. An enclosure for receiving at least one telecommunications cable and for containing telecommunication lines and telecommunication line splices therein, the enclosure comprising:
   a housing extending in a longitudinal direction from a first end to a second end, the housing defining a splicing area, the splicing area having a circumferential shape in a direction transverse to the longitudinal direction;
   at least one port configured for passage of at least one telecommunications cable into the enclosure;
   a support basket disposed in the splicing area, wherein the support basket extends longitudinally within the splicing area of the housing, the support basket shaped to substantially conform to a portion of the circumferential shape of the splicing area and wherein the support basket further comprises a plurality of staggered notches on each longitudinal edge of the basket and a flexible arm including a plurality of slots which correspond to the staggered notches;
   a repositionable, removable support platform disposable on the support basket; and
   a first splice tray disposed on a side of the support platform and repositionable with the support platform, wherein the support platform is positionable in a first orientation on the support basket for storage of one or more of the telecommunication lines and telecommunication line splices and in a second orientation to form a work bench for installation of the telecommunication lines and telecommunication line splices.

8. The assembly of claim 7, further comprising a base member wherein the base member may be configured for attachment to an open first end of the housing to provide an enclosed configuration, wherein the support basket is connected to the base member and wherein the at least one port is formed through the base member.

9. The assembly of claim 7, wherein the housing comprises a first casing member and a second casing member.

10. The assembly of claim 7, further comprising a second splice tray wherein the second splice tray can be one of a hinged splice tray that is pivotally attached to the first splice tray and a stackable splice tray disposed on the first splice tray.

11. The assembly of claim 7, wherein the support basket comprises a U-shaped structure having an interior region defined by generally opposing walls of the support basket, and wherein the support basket includes a multilayer slack storage compartment disposed in the interior region of the support basket.

12. The assembly of claim 7, further comprising a component insert disposed on the first splice tray, where the component insert can hold at least one of a fusion splice, a mechanical splice, 1×N fiber optic splitters, 2×N fiber optic splitters, WDM components, CWDM components, and a combination thereof.

13. The assembly of claim 8, wherein the support platform further comprises a plurality of ears extending from the edges thereof, wherein the ears are engageable with the notches on the support basket and the slots on the flexible arm to place the support platform at one of multiple heights within the support basket.

14. The assembly of claim 7, wherein the support platform further comprises a plurality of ears extending from edges thereof and a plurality of mounting clips projecting from a side opposite the side carrying the splice tray.

15. The assembly of claim 14, wherein the support platform is installed in a second orientation by inserting the ears of the support platform into slits in the support basket and the mounting clips into holes in the support basket.

16. An enclosure for receiving at least one telecommunications cable and for containing telecommunication lines and telecommunication line splices therein, the enclosure comprising:
- a housing extending in a longitudinal direction from a first end to a second end, the housing defining a splicing area cavity extending in the longitudinal direction, the splicing area having a circumferential shape in a direction transverse to the longitudinal direction;
- at least one port configured for passage of at least one telecommunications cable into the enclosure; and
- a support basket disposed longitudinally in the splicing area of the housing, the support basket shaped to substantially conform to a portion of the circumferential shape of the splicing area, wherein the support basket comprises a plurality of staggered notches on opposing longitudinal edges of the support basket, and a flexible arm including a plurality of slots which correspond to the staggered notches, and wherein the support basket includes a multilayer slack storage compartment.

17. The enclosure of claim 16, wherein the support basket comprises a U-shaped structure having an interior region defined by generally opposing walls of the support basket, and wherein the multilayer slack storage compartment is disposed in the interior region of the support basket.

18. The enclosure of claim 17, wherein the multilayer slack storage compartment comprises a first slack storage layer positioned between a first wall portion of the support basket and a first set of tabs formed on the generally opposing walls, and a second slack storage layer positioned between the first set of tabs and a second set of tabs formed on the generally opposing walls at a different height.

* * * * *

UNITED STATES PATENT AND TRADEMARK OFFICE
CERTIFICATE OF CORRECTION

| | | |
|---|---|---|
| PATENT NO. | : 7,697,812 B2 | Page 1 of 1 |
| APPLICATION NO. | : 12/332416 | |
| DATED | : April 13, 2010 | |
| INVENTOR(S) | : Rutesh D Parikh | |

It is certified that error appears in the above-identified patent and that said Letters Patent is hereby corrected as shown below:

On the Title Page,
Item [57] ABSTRACT, line 2, delete the second occurrence of the phrase "at least one port".

In the Claims:
Column 12, Claim 13,
Line 58, delete "claim 8" and insert in place thereof -- claim 7 --.

Signed and Sealed this

Ninth Day of November, 2010

David J. Kappos
*Director of the United States Patent and Trademark Office*